Dec. 17, 1946.  D. W. EPSTEIN  2,412,670
PULSE-ECHO POSITION INDICATOR
Filed June 26, 1942  2 Sheets-Sheet 1
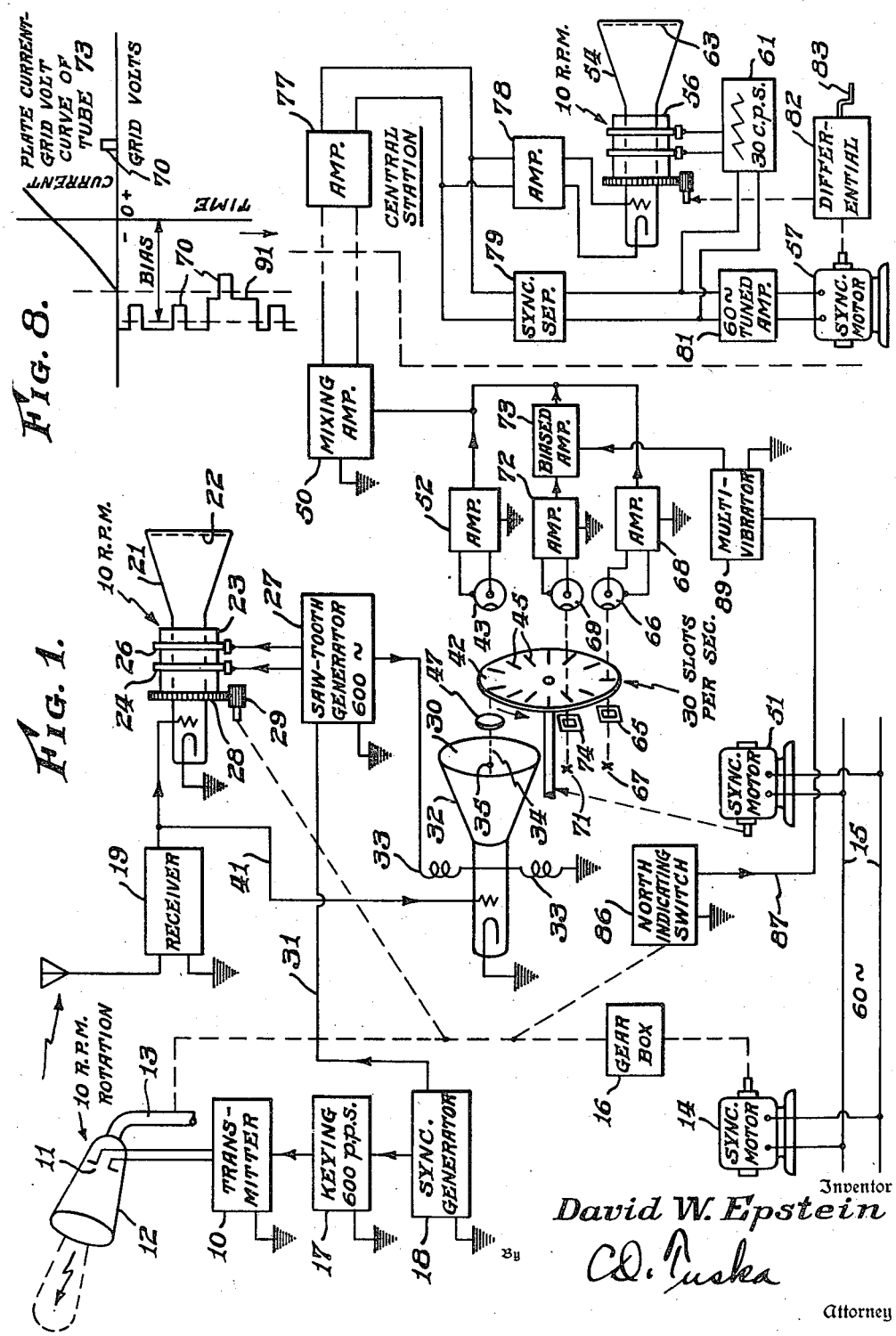
Inventor
David W. Epstein
By C.D. Tuska
Attorney Dec. 17, 1946.  D. W. EPSTEIN  2,412,670
PULSE-ECHO POSITION INDICATOR
Filed June 26, 1942  2 Sheets-Sheet 2
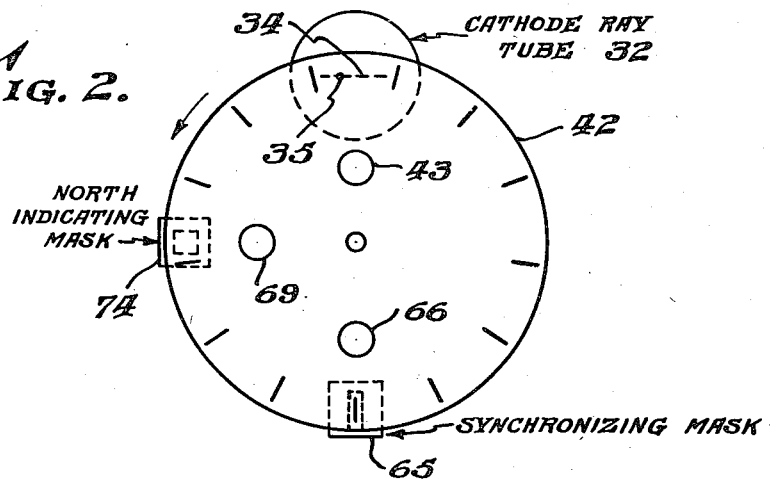
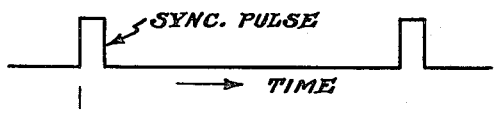
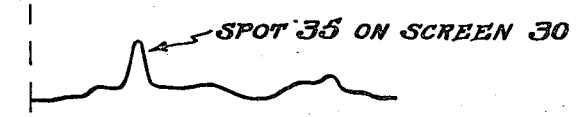
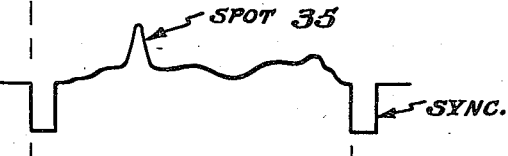
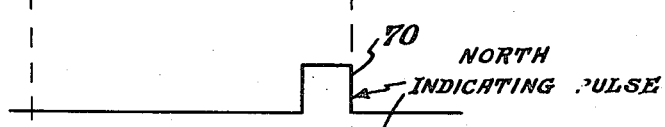
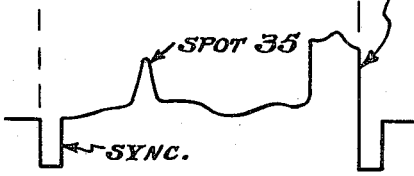
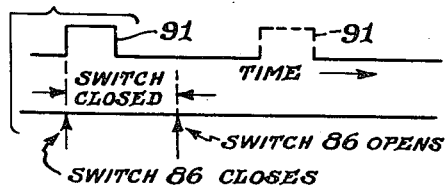
Inventor
David W. Epstein
By  CD. Tuska
Attorney Patented Dec. 17, 1946

2,412,670

UNITED STATES PATENT OFFICE 2,412,670

PULSE-ECHO POSITION INDICATOR

David W. Epstein, Merchantville, N. J., assignor to Radio Corporation of America, a corporation of Delaware Application June 26, 1942, Serial No. 448,663

8 Claims. (Cl. 250—1)

My invention relates to pulse-echo position indicating system and particularly to systems adapted to convey the position information to a remote point or central station. It will be described as applied to a position indication system in which a directive transmitting antenna is rotated horizontally to sweep a radio beam through a horizontal plane while pulsing the beam. The radio pulse is reflected if it strikes an airplane or the like. The reflected pulse is picked up by a receiver located near the pulse transmitter and the distance of the reflecting object is determined by the time elapsed between transmission of the initial or time-reference pulse and reception of the reflected pulse. The direction of the reflecting object is determined also by employing at the receiver a cathode ray indicator tube in which the cathode ray is deflected radially and at the same time, rotated in synchronism with the rotation of the transmitting antenna.

It may be desirable to install a plurality of stations of the above described type spaced apart the proper distance to give protection over a large geographical area. In that case it may be desirable to convey the information from all pulse-echo stations to a central station where one person has before him a view of all the position indicating views or patterns that are present at the individual stations. A difficulty in doing this is that such information ordinarily occupies a fairly wide frequency band, from 100 to 60,000 cycles per second, for example. This band is too wide for transmission over the usual telephone, telegraph or wire line.

An object of the present invention is to provide an improved method of and means for reducing the above-mentioned frequency band, preferably enough to permit transmission of the position indication information over a wire line to a central station.

Another object of the invention is to provide an improved method of and means for conveying information from a radio pulse-echo position indicator to a remote point.

A further object of the invention is to provide an improved means for and method of producing an orienting indication in a system of the above-described type.

In one embodiment of my invention the position indication at the remote station appears on a cathode ray tube provided with a deflecting yoke that is rotated in synchronism with the rotation of the transmitter antenna. The radial deflection produced by this yoke is at a low frequency rate as compared with the rate at the indicator tube located at the transmitter; these rates are 30 per second and 600 per second, respectively, in the example described below. The signal for pulsing or modulating the cathode ray of the indicator tube at the remote station (this signal corresponding to the reflected pulses applied to the indicator tube at the receiver which is usually located in the vicinity of the transmitter) is obtained by applying the reflected pulses to a second cathode ray tube at the transmitter to store them on a fluorescent screen and by deflecting the cathode ray of this tube along a line trace at the pulse rate. The resulting stored pulse appearing at a point on the line trace is scanned by a rotating disc having radial slits which scan the line trace at the low frequency radial deflection rate employed at the remote indicator. When a scanning disc aperture comes opposite the light spot on the line trace, a pulse of light is transmitted to a photoelectric cell to produce a corresponding electrical pulse. These pulses may be transmitted over an ordinary wire line such as a telephone line or over a narrow frequency band transmitter to the cathode ray tube indicator at the remote or central station since their repetition rate in the example assumed is 30 per second, instead of 600 per second as the transmitter station, with a corresponding reduction in the frequency band.

The invention will be better understood from the following description taken in connection with the accompanying drawings in which Fig. 1 is a diagram of a pulse-echo position indicator system embodying the invention, Fig. 2 is a view of the scanning disc shown in Fig. 1, and Figs. 3 to 8a are graphs which are referred to in explaining the invention. Like parts in the figures are indicated by similar reference numerals.

Referring to Fig. 1, a radio transmitter 10 is keyed at the rate of 600 pulses per second, for example, to radiate pulses of very short duration from a suitable directive antenna 11. Antenna 11 may be a dipole in a parabolic reflector 12 or it may be of any other suitable design. It is rotated at 10 rotations per minute, for example, in a horizontal plane about a vertical shaft 13. The shaft 13 is driven by a synchronous motor 14 through a gear box 16, the mechanical coupling being indicated by the broken lines. The motor 14 is connected to a 60 cycle power line 15. Suitable pulse keying means 17 is driven by a synchronizing pulse generator 18.

The receiver 19, which is located in the vicinity of the transmitter, receives the reflected pulses of carrier wave frequency, demodulates them, and applies them to the control electrode of a cathode ray indicator tube 21 having a fluorescent screen 22. Tube 21 is provided with a rotatable deflecting yoke 23 of the magnetic type having slip rings 24 and 26 which are connected through brushes to a sawtooth generator 27. The yoke 23 is rotated synchronously with the antenna rotation by means of gears 28 and 29 which are mechanically coupled to the gear box 16.

The sawtooth generator 27 is synchronized with the radio pulse transmission by means of pulses from the synchronizing generator 18 supplied over a conductor 31. The deflecting wave applied to the yoke 23 contains a direct current component such that the deflection of the cathode ray is from the center of screen 22 toward the circumference. The cathode ray tube 21 may be biased nearly to beam current cutoff in the absence of a received pulse or to some value less than maximum beam current whereby a luminous spot appears on the screen 22 upon the reception of a pulse. This spot has a circumferential position depending upon the direction of the reflecting object from the rotating transmitter antenna and has a radial position (distance from center of screen) depending upon the distance of the reflecting object from the transmitter antenna.

If an attempt were made to transmit the reflected pulse, which recurs at 600 times per second, to a remote station over an ordinary wire line, for example, it would be found that the fidelity of transmission would be very poor as the line would not transmit the required frequency band. Therefore, I have provided means for reducing the frequency band required whereby information sent over a line to a central station will give on the indicator tube an acceptable indication of the position of the airplane or other reflecting object.

The frequency band reducing means comprises a cathode ray tube 32 having a fluorescent screen 30 on the enlarged end. Deflection of the cathode ray is provided by means of a pair of deflecting coils 33 which are supplied with sawtooth current from the sawtooth generator 27. The 600 cycle sawtooth current is synchronous with the keying pulses.

The tube 32 is properly biased nearly to beam cutoff, for example, so that a spot of light 35 appears on the screen 30 when a reflected pulse is applied to the control electrode of tube 32 over a conductor 41. This light spot appears at a point on the linear deflection path or trace indicated by the dotted line 34 and at a position determined by the time that the reflected pulse appears upon the control electrode.

A rotatable disc 42 having a plurality of radial slit apertures 45 is located opposite the screen 30. In order to direct light from the spot 35 to a photoelectric cell 43, a lens system 47 is provided to image the light spot 35 on a disc aperture. The disc 42 is rotated to cause the apertures 45 to scan the spot 35 at a low rate compared with the pulse rate, this being 30 per second in the example illustrated whereby the frequency band is reduced to 30/600 or 1/20 of the original band width. The disc may be driven by a motor 51 which may or may not be synchronous. The pulse output of the photoelectric cell 43 is amplified by an amplifier 52 and transmitted through a mixing amplifier 50 and over a wire line to the central station.

At the central station there is a cathode ray indicator tube 54 which, like the tube 21, is provided with a rotatable deflecting yoke 56 that is rotated in synchronism with the antenna rotation. This may be done by a synchronous motor 57 that is driven synchronously from the telephone line as will be explained below. A sawtooth deflecting wave recurring 30 times per second is produced in the yoke 56 by a sawtooth wave generator 61 to deflect the cathode beam radially. The generator 61 is held in fixed time relation to the pulse transmission by synchronizing pulses transmitted over the wire line. It will be understood that at the indicator tubes 21 and 54 the sawtooth sweep is so phased with respect to the transmitter pulse that the deflection starts from the center of the fluorescent screen at the instant the pulse is transmitted. The fluorescent screen of the tube 54 is indicated at 63.

The synchronizing pulses for controlling both the sawtooth generator 61 and the synchronous motor 57 are produced at a photoelectric cell 66 positioned opposite the scanning disc 42 whereby light from a source 67 falls upon the cell 66 each time a slit aperture 45 comes between the source 67 and the cell 66. A mask 65 may be provided to define an area of light opposite a disc aperture. The resulting synchronizing pulses are amplified by an amplifier 68 and are supplied to the mixing amplifier 50.

Reference or "north indicating" pulses 70 are also produced by means of a photoelectric cell 69 and a light source 71 positioned on opposite sides of the scanning disc 42. The pulses from the cell 69 are amplified by an amplifier 72 and are supplied through a biased amplifier 73 to the mixing amplifier 50. A mask 74 limits the area of light opposite the synchronizing slit.

Fig. 2 indicates the relative radial positions of the photoelectric cells 43, 69 and 66 (which have been displaced toward the center of the scanning disc to avoid confusion in the drawings) and of their associated light sources while Figs. 3 to 4 show the photoelectric cell outputs and the way in which they are mixed. The rotation of the scanning disc 42 is in the direction indicated by the arrow. At the instant the disc 42 is in the position illustrated, a synchronizing pulse (Fig. 3) is being generated and a north indicating pulse (Fig. 6) has just been generated. The line trace 34 and spot 35 (Fig. 4) have already been scanned and will now be scanned again.

As shown in Fig. 5, the synchronizing pulses are reversed in polarity by amplifier 68 and are mixed in amplifier 50 with the signal representative of spot 35. Also, the reference or north indicating pulse is combined with the signal (shown in Fig. 5) to produce the resultant signal shown in Fig. 7. This signal is sent over the wire line to the central station.

At the central station the signal is amplified by amplifiers 77 and 78 and is applied to the control electrode of cathode ray tube 54 with the synchronizing pulses of negative polarity. The same signal, but preferably of opposite polarity, is supplied to a synchronizing pulse separator 79 whereby synchronizing pulses may be supplied to the deflecting circuit 61 and to a tuned amplifier 81 which drives the motor 57. A differential gear 82 permits phasing of the yoke 56 by turning a crank 83.

The north indicating pulse appears on the screen of tube 54 only when the antenna 11 is pointing north (or is pointing in some other predetermined direction). This is accomplished by driving a switch 86 from the gear box 16 or from antenna shaft 13 so that the switch 86 is closed only when antenna 11 is pointing in the desired direction. When the switch 86 closes it completes a circuit through a conductor 87 to unblock a relaxation oscillator much as a multivibrator 89 whereby multivibrator pulses 91 (Figs. 8 and 8a) are produced. When the switch 86 is closed it connects the cathode of a multivibrator tube to ground to initiate a pulse 91.

Multivibrator 89 is adjusted so that a pulse 91 which is short enough to add only one "north indicating" pulse 70 is added thereto in the biased amplifier 73 as shown in Fig. 8. As shown in Fig. 8a, the antenna switch 86 is opened before another multivibrator pulse 91 indicated in dotted line in Fig. 8a can occur. As shown in Fig. 8, the amplifier 73 is biased sufficiently beyond cutoff so that a north indicating pulse is passed to the mixing amplifier 50 only upon the occurrence of a multivibrator pulse 91.

The persistence of fluorescence of the screen 63 and of the screen 22 of tube 21 should be several seconds, preferably six seconds where the yoke rotates 10 R. P. M. (i. e., once in 6 seconds). The persistence of fluorescence of the screen 30 of the tube 32 should be at least 1/600 second (the time of one deflection) and preferably is about 1/30 second in the example shown for good signal to noise ratio. The fluorescence decays gradually, as is well known, but a satisfactory screen is one in which the light falls to one-half maximum intensity in 1/30 second, for example.

From the foregoing it will be apparent that the pulse produced in the photoelectric cell 43 occurs at a time following the instant of pulse transmission which is measured by the time taken for a disc aperture to rotate from a "zero delay" position which is at one end of the scanning line 34 to the position of the spot of light 35. Thus the 30 cycle pulses sent over the line to the central station have a time delay with respect to the instant of pulse transmission that corresponds accurately to the delay between pulse transmission and pulse reception at receiver 19. The radial position indication on the indicator tube 54 will be the same as on the indicator tube 21. It will also be seen that the north indicating pulse is obtained without the use of any mechanical connection between the rotating antenna 11 and the scanning disc 42. This may be an important advantage as the frequency reducing unit comprising disc 42 may be located several hundred feet from the antenna. A further advantage is that with the proposed reference or north indicating system the scanning disc 42 itself need not be held in synchronism with the rotating antenna. A still further advantage is that by means of my system a very exact timing of the north indicating pulse is obtained at the indicator tube 54.

I claim as my invention:

1. In a system for reducing the frequency band required to transmit the information contained in a wave consisting of periodically recurring electrical pulses each of which occurs at a certain time after the occurrence of a time-reference pulse, means comprising a cathode ray tube and a fluorescent screen associated therewith for storing an image of said first pulses on said screen with said image spaced from a time reference point by an amount determined by said certain time, said means including deflecting means for producing a straight line trace on said screen, and means for scanning said trace at a slower rate than that of the first pulses to convert said stored image to pulses recurring at said slower rate.

2. In a system for reducing the frequency band required to transmit the information contained in a wave consisting of periodically recurring electrical pulses each of which occurs at a certain time after the occurrence of a time-reference pulse, means comprising a cathode ray tube and a screen associated therewith for storing an image of said first pulses on said screen with said image spaced from a time reference point by an amount determined by said certain time, said means including deflecting means for producing a straight line trace on said screen, and means for scanning said trace at a slower rate than that of the first pulses to convert said stored image to pulses recurring at said slower rate, said scanning means comprising a scanning disc having a plurality of radial slits therein.

3. In a radio system, means for transmitting pulses to an object whereby they are reflected from said object, said pulses recurring at a certain rate, means for receiving said reflected pulses in the region of the transmitting means, there being a certain time interval between said transmission and reception, a cathode ray tube having a fluorescent screen that has persistence of fluorescence, means for deflecting the cathode ray along a linear trace on said screen at said certain rate, means for modulating said cathode ray by said reflected pulses whereby an image thereof is stored on said screen, means for scanning said screen at a lower rate than said certain rate and for simultaneously taking signal off said screen at said lower rate to produce pulses at said lower rate, said last means including a scanning disc having a plurality of circumferentially spaced apertures located to rotate the apertures past said trace to scan it lengthwise, a cathode ray indicator tube having a beam control element, means for applying said pulses occurring at the lower rate to said control element, and means for deflecting the cathode ray of said indicator tube at said lower frequency.

4. In a system for indicating the position of an object, means for transmitting pulses to said object from a directive rotating antenna whereby they are reflected from said object, said pulses recurring at a certain rate, means for receiving said reflected pulses in the region of the transmitting means, there being a certain time interval between said transmission and reception, a cathode ray tube having a storage screen, means for deflecting the cathode ray along a straight line trace on said screen at said certain rate, means for modulating the said cathode ray by said reflected pulses whereby an image thereof is stored on said screen, means comprising a rotatable disc having circumferentially spaced slits for scanning said trace at a lower rate than said certain rate and for simultaneously taking signal off said screen at said lower rate to produce pulses occurring at said lower rate, a cathode ray indicator tube which contains means for generating an electron beam, means for applying said lower rate pulses to said indicator tube to modulate said beam, means for radially deflecting the electron beam of said indicator tube, means for rotating the plane of said radial deflection in synchronism with the rotation of said antenna, and means for producing said radial deflection at said lower rate with the deflection from center starting substantially at the instant of a pulse transmission.

5. In a system for indicating the position of an object, means for transmitting pulses to said object from a directive rotating antenna whereby they are reflected from said object, said pulses recurring at a certain rate, means for receiving said reflected pulses in the region of the transmitting means, there being a certain time interval between said transmission and reception, a cathode ray tube having a storage screen, means for deflecting the cathode ray along a straight line trace on said screen at said certain rate, means for modulating said cathode ray by said reflected pulses whereby an image thereof is stored on said screen, means comprising a rotatable disc having circumferentially spaced slits for scanning said trace at a lower rate than said certain rate and for simultaneously taking signal off said screen at said lower rate to produce pulses occurring at said lower rate, a cathode ray indicator tube which contains means for generating an electron beam, means for applying said lower rate pulses to said indicator tube to modulate said beam, means for radially deflecting the electron beam of said indicator tube, means for rotating the plane of said radial deflection in synchronism with the rotation of said antenna, means for producing said radial deflection at said lower rate with the deflection from center starting substantially at the instant of a pulse transmission, and means for increasing the intensity of the indicator tube beam momentarily in response to the rotating antenna reaching a predetermined point in its rotation.

6. In a system for indicating the position of an object, means for transmitting pulses to said object from a directive rotating antenna whereby they are reflected from said object, said pulses recurring at a certain rate, means for receiving said reflected pulses in the region of the transmitting means, there being a certain time interval between said transmission and reception, a cathode ray tube having a fluorescent screen that has persistence of fluorescence, means for deflecting the cathode ray along a straight line trace on said screen at said certain rate, means for modulating said cathode ray by said reflected pulses whereby an image thereof is stored on said screen, means comprising a rotatable disc having circumferentially spaced slits for scanning said trace at a lower rate than said certain rate and for simultaneously taking signal off said screen at said lower rate to produce pulses at said lower rate, a cathode ray indicator tube which contains means for generating an electron beam, means for applying said lower rate pulses to said indicator tube to modulate said beam, means for radially deflecting the electron beam of said indicator tube, means for rotating the plane of said radial deflection in synchronism with the rotation of said antenna, means for producing said radial deflection at said lower rate with the deflection from center starting substantially at the instant of a pulse transmission, means including a photoelectric device located adjacent to said scanning disc for producing synchronizing pulses for synchronizing the deflection of said indicator tube, and means including a second photoelectric device located adjacent to said scanning disc and circumferentially displaced with respect to the other photoelectric device for increasing the intensity of the indicator tube beam momentarily in response to the rotating antenna reaching a predetermined point in its rotation.

7. In a system for indicating the position of an object, means for transmitting pulses to said object from a directive rotating antenna whereby they are reflected from said object, said pulses recurring at a certain rate, means for receiving said reflected pulses in the region of the transmitting means, there being a certain time interval between said transmission and reception, a cathode ray tube having a storage screen, means for deflecting the cathode ray along a recurring path or trace on said screen at said certain rate, means for modulating said cathode ray by said reflected pulses whereby an image thereof is stored on said screen, means comprising a rotatable scanning disc having a plurality of apertures for scanning said trace at a lower rate than said certain rate and for simultaneously taking signal off said screen at said lower rate to produce pulses occurring at said lower rate, a cathode ray indicator tube which contains means for generating an electron beam, means for applying said lower rate pulses to said indicator tube to modulate said beam, means for radially deflecting the electron beam of said indicator tube, means for rotating the plane of said radial deflection in synchronism with the rotation of said antenna, means for producing said radial deflection at said lower rate with the deflection from center starting substantially at the instant of a pulse transmission, and means for increasing the intensity of the indicator tube beam momentarily in response to the rotating antenna reaching a predetermined point in its rotation, said last means including a photoelectric device and light source for producing a reference voltage pulse in response to a scanning aperture moving across the path of light from said light source to said photoelectric device, a biased amplifier tube, switch means for producing a voltage pulse in response to said antenna reaching said predetermined point, and means for utilizing said last pulse to unblock said biased amplifier momentarily to pass one of said reference pulses to said indicator tube.

8. In a system for indicating the position of an object, means for transmitting pulses to said object from a directive rotating antenna whereby they are reflected from said object, said pulses recurring at a certain rate, means for receiving said reflected pulses in the region of the transmitting means, there being a certain time interval between said transmission and reception, a cathode ray tube having a storage screen, means for deflecting the cathode ray along a recurring path or trace on said screen at said certain rate, means for modulating said cathode ray by said reflected pulses whereby an image thereof is stored on said screen, means comprising a rotatable scanning disc having a plurality of apertures for scanning said trace at a lower rate than said certain rate and for simultaneously taking signal off said screen at said lower rate to produce pulses occurring at said lower rate, a cathode ray indicator tube which contains means for generating an electron beam, means for applying said lower rate pulses to said indicator tube to modulate said beam, means for radially deflecting the electron beam of said indicator tube, means for rotating the plane of said radial deflection in synchronism with the rotation of said antenna, means for producing said radial deflection at said lower rate with the deflection from center starting substantially at the instant of a pulse transmission, and means for increasing the intensity of the indicator tube beam momentarily in response to the rotating antenna reaching a predetermined point in its rotation, said last means including photoelectric means for producing a reference voltage pulse each time a scanning aperture passes a certain point, a biased amplifier, a relaxation oscillator which is normally blocked and which is adjusted to produce a voltage pulse of a duration greater than that of said reference pulse but less than the period of recurrence of said reference pulses when it is unblocked, switch means for producing a voltage pulse in response to said antenna reaching said predetermined point, means for applying said last pulse to said relaxation oscillator to unblock it momentarily, and means for applying said reference pulses and said relaxation oscillator pulses in additive relation to said biased amplifier and with such amplitudes that only the reference pulse which is added to a relaxation oscillator pulse is passed by said biased amplifier.

DAVID W. EPSTEIN.